(12) United States Patent
Varga

(10) Patent No.: US 6,905,380 B1
(45) Date of Patent: Jun. 14, 2005

(54) COUNTER ROTATING AIR PROPELLER DRIVE SYSTEM

(75) Inventor: Joseph Varga, Woodbridge (CA)

(73) Assignee: Husky Airboats Ltd., Bolton (CA)

( * ) Notice: Subject to any disclaimer, the term of this patent is extended or adjusted under 35 U.S.C. 154(b) by 61 days.

(21) Appl. No.: 10/717,529

(22) Filed: Nov. 21, 2003

(51) Int. Cl.⁷ .............................................. B63H 7/00
(52) U.S. Cl. ......................................... 440/37; 440/75
(58) Field of Search ................................... 440/37, 75

(56) References Cited

U.S. PATENT DOCUMENTS

| | | |
|---|---|---|
| 2,341,911 A | 2/1944 | Drexler et al. |
| 4,015,555 A | 4/1977 | Tinkham |
| 4,027,553 A * | 6/1977 | Eichinger et al. ............. 440/75 |
| 4,962,718 A * | 10/1990 | Gornstein et al. .......... 114/274 |
| 5,151,059 A | 9/1992 | Higby |
| 5,529,520 A | 6/1996 | Iwashita et al. |
| 5,558,498 A | 9/1996 | Ogino |
| 5,643,025 A * | 7/1997 | Suzuki ........................ 440/75 |
| 5,724,867 A | 3/1998 | Jordan |
| 5,839,926 A | 11/1998 | Kaye |
| 5,890,938 A | 4/1999 | Eick et al. |
| 6,053,782 A | 4/2000 | Jordan |
| 6,299,495 B1 | 10/2001 | Jordan |
| 6,478,641 B2 | 11/2002 | Jordan |
| 6,540,570 B1 | 4/2003 | Eakin |

* cited by examiner

Primary Examiner—Jesus D. Sotelo
(74) Attorney, Agent, or Firm—Derek K. W. Smith

(57) ABSTRACT

An airboat and drive system for operating a pair of counter rotating air propellers that propel an airboat are described. An engine is mounted low in the hull of an airboat to lower the center of gravity and provide a more stable airboat. The drive system is connected to the engine through a drive shaft. The drive system includes a transmission, interconnecting frame, and counter rotating air propeller drive. The interconnecting frame mounts the counter rotating air propeller drive above the transmission providing proper clearance for the air propellers with the hull of the airboat. The transmission and counter rotating air propeller drive are connected through an interconnecting drive shaft. The amount of noise from a conventional belt drive is reduced. The modular design and simplified drive system is easier to assemble and align.

28 Claims, 11 Drawing Sheets

COUNTER ROTATING AIR PROPELLER DRIVE SYSTEM

BACKGROUND OF INVENTION

1. Field of the Invention

The present invention is directed to a drive system, and more particularly to a drive system for operating a pair of counter rotating air propellers that propel an airboat.

2. Background Information

Drive systems for propelling airboats are known in the art. For example, U.S. Pat. No. 6,540,570 B1 issued to Eakin on Apr. 1, 2003. This reference illustrates an airboat where the engine is mounted high above the hull. A small compact transmission is driven by the engine through a belt connection located between a drive shaft and a sprocket. A number of gears transmit power from the engine and rotate the air propellers.

Other examples of prior art airboat drive systems include:
  (a) U.S. Pat. No. 5,839,926 issued to K-Way on Nov. 24, 1998,
  (b) U.S. Pat. No. 6,053,782 issued to Bell on Apr. 25, 2000,
  (c) U.S. Pat. No. 6,478,641 issued to Jordan on Nov. 12, 2002,
  (d) U.S. Pat. No. 5,724,867 issued to Jordan on Mar. 10, 1998, and
  (e) U.S. Pat. No. 6,299,485 issued to Jordan on Oct. 9, 2001.

All of these references illustrate an engine mounted high above the hull of an airboat. A single compact transmission is driven by a direct connection to the engine through a drive shaft. A number of gears are provided to operate a pair of output drive shafts. One of the output drive shafts is hollow and surrounds the other solid drive shaft to rotate the air propellers.

The prior art airboat drive system references consistently teach mounting an engine high above the hull of an airboat in combination with a single compact transmission. Keeping the engine high and the transmission compact provides the necessary clearance between the tips of the air propellers and the hull of the airboat.

However, there are a number of problems with the prior art airboat drive systems. The transmissions are overly complex with many gears. They require multiple long output drive shafts, including a solid output drive shaft located within a hollow output drive shaft. Mounting the engine and drive system high above the hull creates a high center of gravity. The compactness, and horizontal input and output shafts of these transmissions renders the transmission completely unusable in situations when an engine is mounted low in the hull of an airboat.

Another example of a prior art drive system is shown in the Husky™ Nattiq™ airboat (www.huskyairboats.com). This airboat has the engine mounted low in the hull of an airboat. The existing drive system is an elongated belt extending from a pulley mounted on an end of a drive shaft of an engine to another pulley mounted on a air propeller drive shaft. However, external belt drives are very noisy, prone to wear, and can become dangerous upon failure of the belt.

Other examples of prior art marine drive systems with counter rotating water propellers are also known. These include inboard stern drives and lower units for outboard motors such as:
  (a) U.S. Pat. No. 5,890,938 issued to Brunswick on Apr. 6, 1999,
  (b) U.S. Pat. No. 5,529,520 issued to Kaisha on Jun. 25, 1996, and
  (c) U.S. Pat. No. 5,558,498 issued to Kaisha on Sep. 24, 1996

However, the marine based prior art solutions also suffer from overly complex transmissions, specific hydrodynamic housings for application in a water environment, and multiple drive shafts (again, a solid drive shaft inside a hollow drive shaft). Assembly of these units is difficult and time consuming. This area of prior art is simply not adaptable to airboats for operating a pair of air propellers.

Therefore, there is a need for a drive system for counter rotating a pair of air propellers when an engine is mounted low in the hull of an airboat.

SUMMARY OF INVENTION

The present invention has many advantages. Mounting the engine low in the hull of the airboat provides a more stable airboat with a lower center of gravity. The drive system elevates the propellers to provide the proper clearance between the tips of the air propellers and the hull of the airboat. The amount of noise from a conventional belt drive is reduced. The modular design and simplified drive is easier to assemble and align. The second hollow drive shaft and the complexities associated with it are eliminated.

In one broad aspect of the present invention, a counter rotating air propeller drive system is provided. The counter rotating air propeller drive system includes a housing, a first drive, a second drive, and a third drive. The housing supporting the first drive in engaging relationship with the second drive. The housing also supporting the first drive in engaging relationship with the third drive. The third drive including an air propeller mount for receiving a first air propeller. The second drive coupled to an air propeller output drive shaft for receiving a second air propeller. In operation, the first drive operates the second drive in a first direction and the first drive operates the third drive in an opposite direction for counter rotating the air propeller mount and the air propeller output drive shaft.

In another broad aspect of the present invention, an airboat is provided. The airboat includes a hull, an engine disposed in the hull, an air rudder, and a counter rotating air propeller drive system. The counter rotating air propeller drive system includes a housing, a first drive, a second drive, and a third drive. The housing supporting the first drive in engaging relationship with the second drive. The housing also supporting the first drive in engaging relationship with the third drive. The third drive including an air propeller mount for receiving a first air propeller. The second drive coupled to an air propeller output drive shaft for receiving a second air propeller. In operation, the first drive operates the second drive in a first direction and the first drive operates the third drive in an opposite direction for counter rotating the air propeller mount and the air propeller output drive shaft.

The first drive includes a first housing member retaining the first drive in relationship with the second drive and the third drive.

The second drive includes a second housing member retaining the second drive in relationship with the first drive.

The third drive includes a third housing member retaining the third drive in relationship with the first drive.

The first drive is a first bevel gear, the second drive is a second bevel gear and the third drive is a third bevel gear. Teeth on the first bevel gear engage teeth on the second bevel gear. Teeth on the first bevel gear engage teeth on the third bevel gear for counter rotating the second bevel gear and the third bevel gear.

In an embodiment, the third drive includes a mount for receiving a first air propeller hub and the first air propeller is coupled to the first air propeller hub. Alternatively, the first air propeller is coupled directly to the third drive.

In an embodiment, the air propeller output drive shaft includes a mount for receiving a second air propeller hub and the second air propeller is coupled to the second air propeller hub. Alternatively, the second air propeller is coupled directly to the third drive.

Preferably, teeth on the first bevel gear engage teeth on the second bevel gear and teeth on the first bevel gear engage teeth on the third bevel gear for rotating the air propellers at the same speed. Alternatively, a first region of teeth on the first bevel gear engage teeth on the second bevel gear and a second region of teeth on the first bevel gear engage teeth on the third bevel gear for rotating the air propellers at differential speeds.

The drive system further includes a second housing, a fourth drive, a fifth drive, an interconnecting drive shaft, and a frame. The second housing supporting the fourth drive in engaging relationship with the fifth drive. The interconnecting drive shaft engaging the fourth drive and the interconnecting drive shaft engaging the first drive wherein rotating the fourth drive rotates the interconnecting drive shaft for rotating the first drive.

The fourth drive includes a fourth housing member retaining the fourth drive in relationship with the fifth drive.

The fifth drive includes a fifth housing member retaining the fifth drive in relationship with the fourth drive.

The fourth drive includes a fourth bevel gear. The fifth drive includes a fifth bevel gear. Teeth on the fourth bevel gear engage teeth on the fifth bevel gear for rotating in operation the interconnecting drive shaft.

The fifth bevel gear includes a mount for receiving an input drive shaft for rotating in operation the fifth drive.

BRIEF DESCRIPTION OF DRAWINGS

Exemplary embodiments of the present invention will now be described with reference to the accompanying drawings, in which.

DETAILED DESCRIPTION

Figure 1:
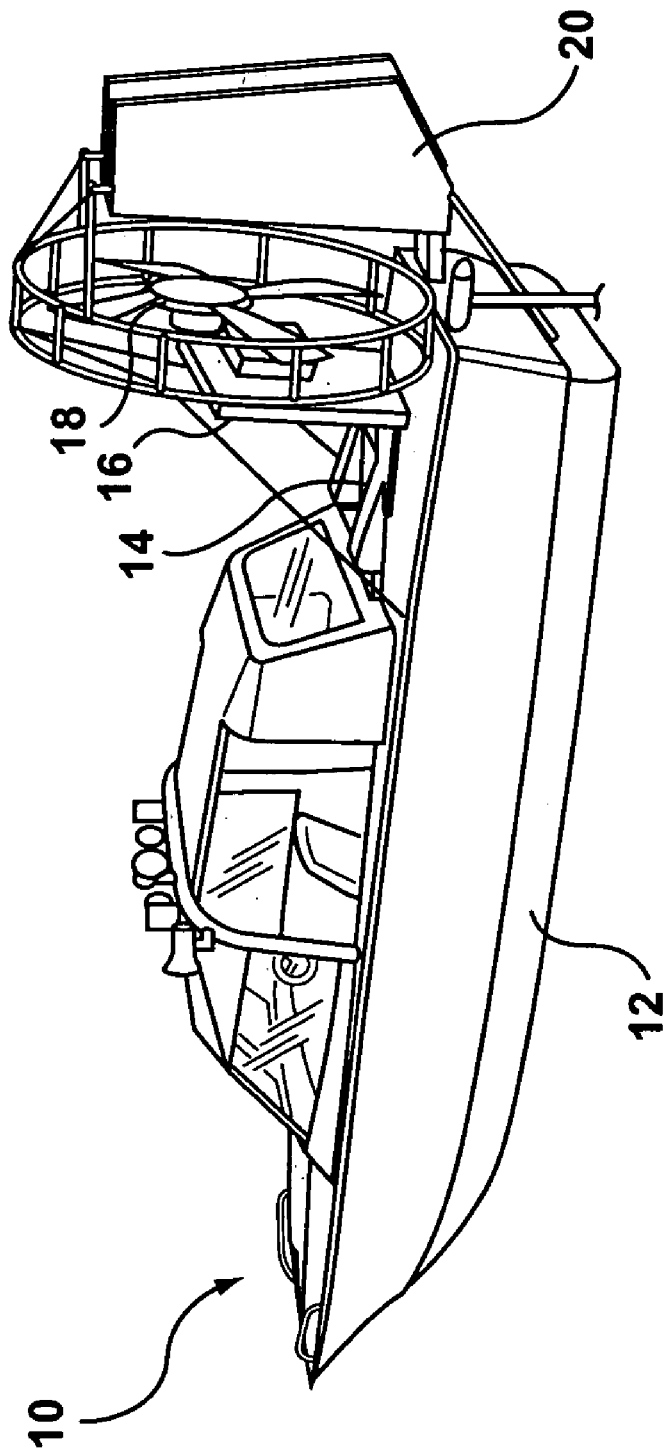
FIG. 1 is a perspective view of an airboat and a counter rotating air propeller drive system.

The present invention is described in accordance with a preferred embodiment as illustrated with reference to FIG. 1. An airboat is generally indicated at 10. The airboat 10 is capable of operating on water, ice, and snow. The airboat 10 includes a hull 12. An engine 14 is mounted low in the hull 12 of the airboat 10 to keep the center of gravity low. The engine 14 is connected through a drive shaft (not shown) to a drive system 16 (schematic representation). The drive system 16 includes a transmission, interconnecting frame, and counter rotating air propeller drive (see FIG. 2). A pair of air propellers 18 are connected to the counter rotating drive and in operation, the air propellers rotate in opposite directions to provide the necessary thrust to propel the airboat 10 forward. A pair of air rudders 20 are provided in order to maneuver the airboat 10 in operation by re-directing the flow of air to turn the airboat 10 either left or right. Those skilled in the art will appreciate the airboat 10 could be alternatively equipped with a single air rudder.

Figure 2:
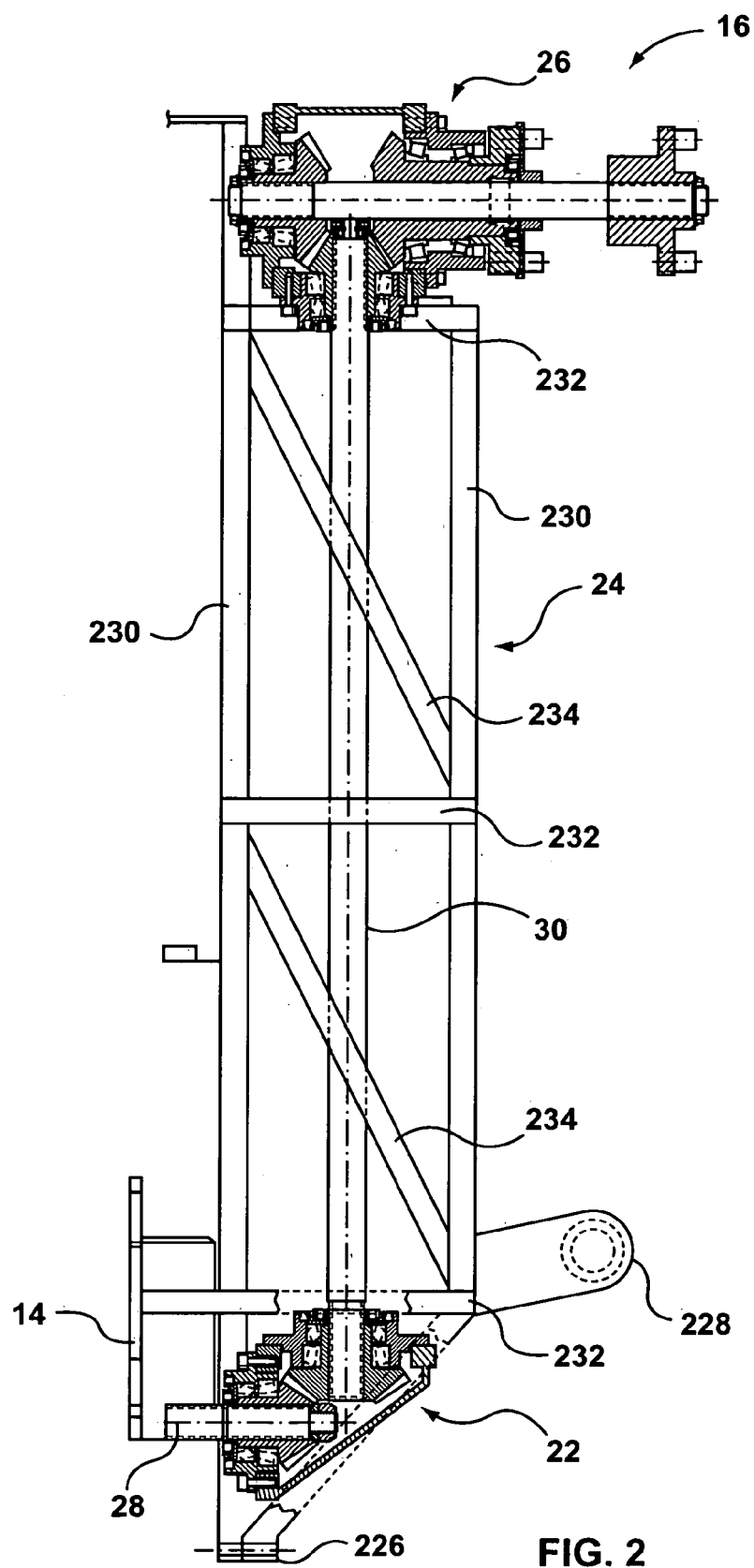
FIG. 2 is a cross sectional side view of a drive system illustrating a transmission, interconnecting frame, and counter rotating air propeller drive.

Referring now to FIG. 2, the drive system of the present invention is further described. The engine 14 (only a diagrammatic portion is illustrated) is connected to the transmission 22 through a drive shaft 28. The transmission 22 is mounted low in the hull 12 of the airboat 10 in alignment with the engine 14. The counter rotating air propeller drive 26 is disposed above the transmission 22 by the interconnecting frame 24 at a suitable height to provide clearance for the air propellers 18 (not shown) with the hull of the airboat 10. The transmission 22 and counter rotating air propeller drive 26 are connected through an interconnecting drive shaft 30 to transmit power from the transmission 22 to the counter rotating air propeller drive 26. The transmission 22 and the counter rotating air propeller drive 26 are retained in operational alignment by the frame 24.

Figure 12:
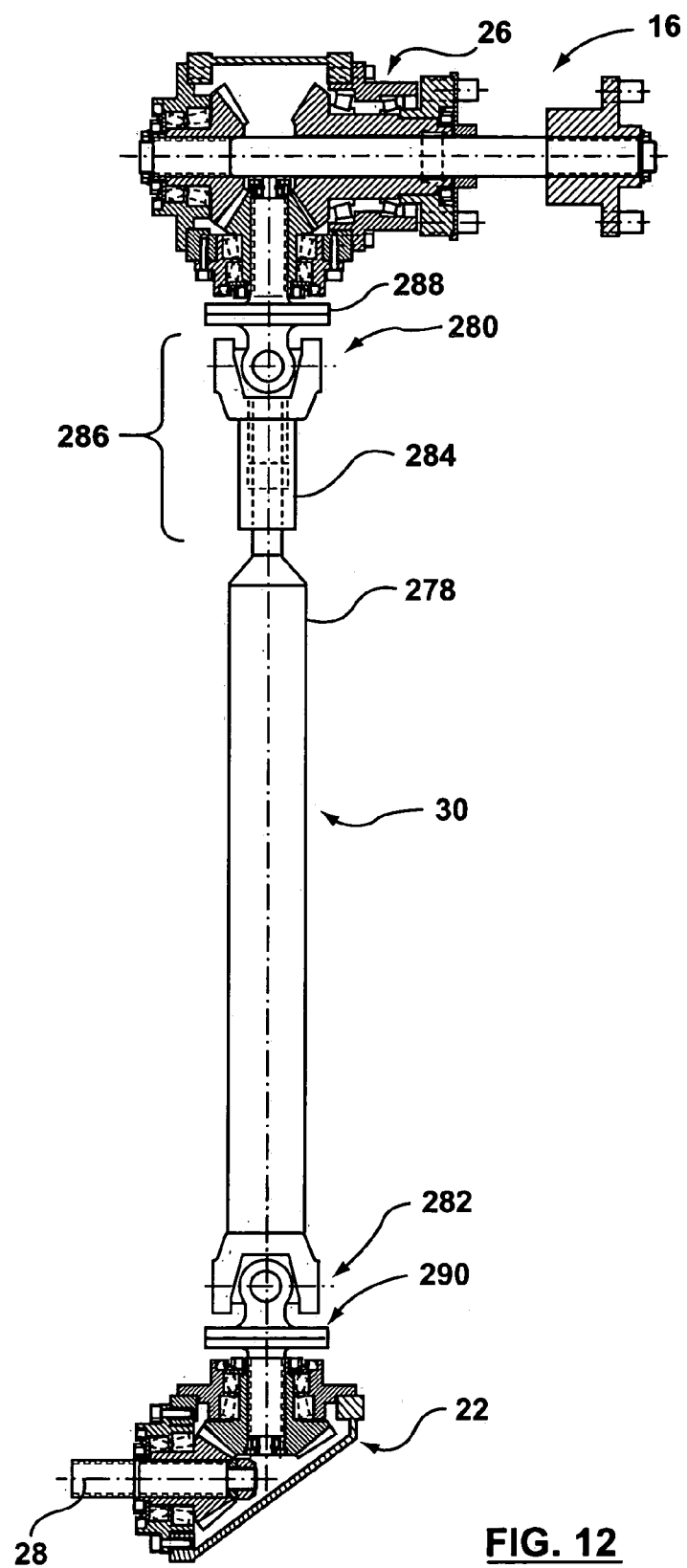
FIG. 12 is a cross sectional side view of a drive system illustrating an alternative embodiment of the interconnecting drive shaft.

Referring now to FIG. 12, an alternative embodiment of the present invention is described with respect to the interconnecting drive shaft 30. In this embodiment, the interconnecting drive shaft 30 includes a primary drive interconnect 290, a primary universal joint 282, a primary drive section 278, a secondary drive section 286 and secondary drive interconnect 288.

The primary drive interconnect 290 has a long splined shaft that interfaces to the fourth drive in the transmission 22 through the mount 184 (see FIG. 10) and is retained with the fourth drive. A primary universal joint 282 connects the primary drive interconnect 290 to the primary drive section 278 at one end. This provides a first flexible joint between the transmission 22 and the counter rotating air propeller drive 26. The primary drive section 278 includes a long splined shaft at another end to interface with a secondary drive section 286. The secondary drive section 286 has a complimentary splined mount for receiving the long splined shaft. The spines cooperate to rotate both members while permitting a vertically sliding joint between the primary drive section 278 and the secondary drive section 278.

The secondary drive section 286 is connected to the secondary drive interconnect 288 by a secondary universal joint 280. This provides a second flexible joint between the transmission 22 and the counter, rotating air propeller drive 26. An end of the secondary drive interconnect 288 includes a long splined shaft that interfaces to the mount 94 of the first drive 36 in the counter rotating air propeller drive 26.

The alternative embodiment of the interconnecting drive shaft 30 provides two flexible joints and one vertically sliding joint when mounting the counter rotating air propeller drive 26 at differing vertical and horizontal alignments from the transmission 22 while providing rotation movement of the interconnecting drive shaft 30.

Figure 3:
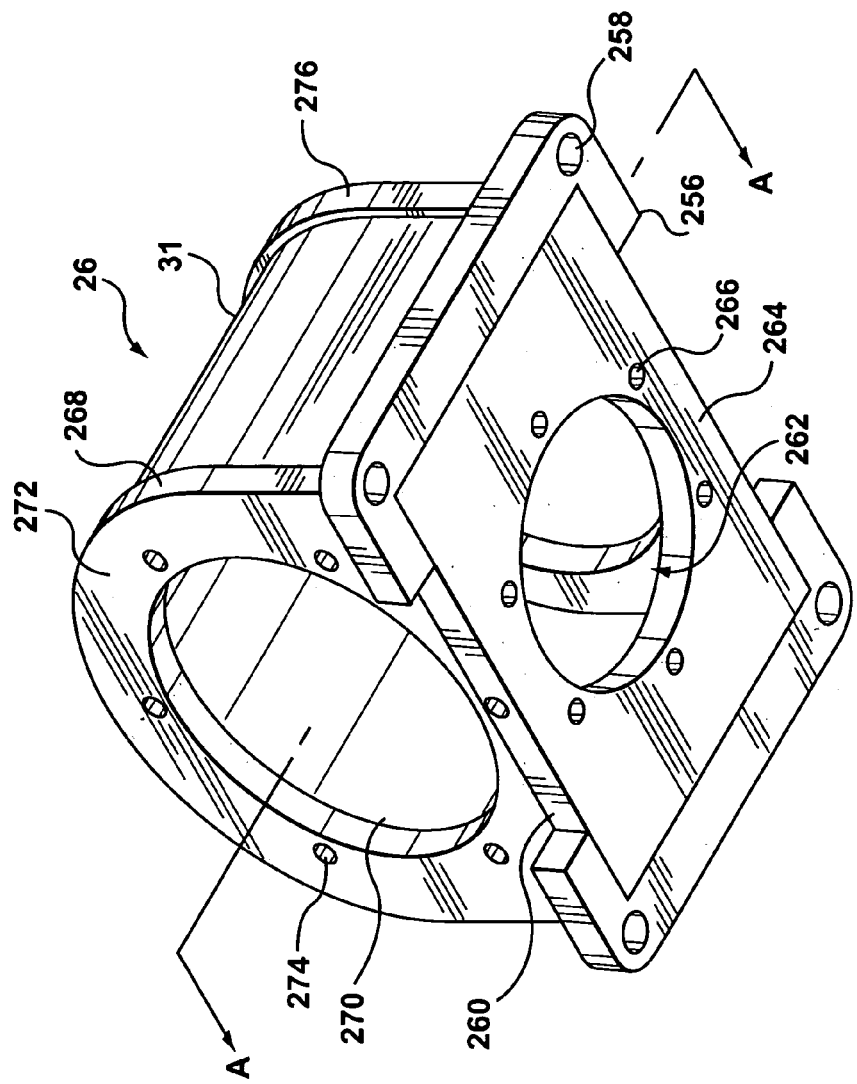
FIG. 3 is a perspective view of the counter rotating air propeller drive.

Referring now to FIG. 3, the central housing 31 of the counter rotating air propeller drive 26 is described. The central housing 31 includes a bottom member 260. The bottom member 260 has a mounting surface 264 and a central opening 262. The central opening 262 and surface 264 receive for mounting the first drive 36 (not shown). A plurality of threaded bores 266 are provided in the bottom member 260 for securing and sealing the first drive 36 to the bottom member 260 by a plurality of fasteners, for example bolts.

The central housing 31 also includes a front member 268. The front member 268 has a mounting surface 272 and a central opening 270. The central opening 270 and surface 272 receive for mounting the second drive 38 (not shown). A plurality of threaded bores 274 are provided in the front member 268 for securing and sealing the second drive 28 to the front member 268 by a plurality of fasteners, for example bolts.

The central housing 31 also includes a back member 276. The back member is substantially the same as the front member 268 (for example, the size of the central opening may be a different diameter, larger in the preferred embodiment). The back member has a mounting surface (not shown) and central opening (not shown). The third drive 40 is received for mounting by the surface and central opening of the back member 276. A plurality of threaded bores (not shown) are provided in the back member 276 for securing the third drive 40 to the back member 276 by a plurality of fasteners, for example bolts.

The central housing 31 also includes a frame mount member 256. The frame mount member 256 has a plurality of bores 258. The frame mount member 256 and bores 258 are for mounting and securing the central housing 31 in the interconnecting frame 24.

Figure 4:
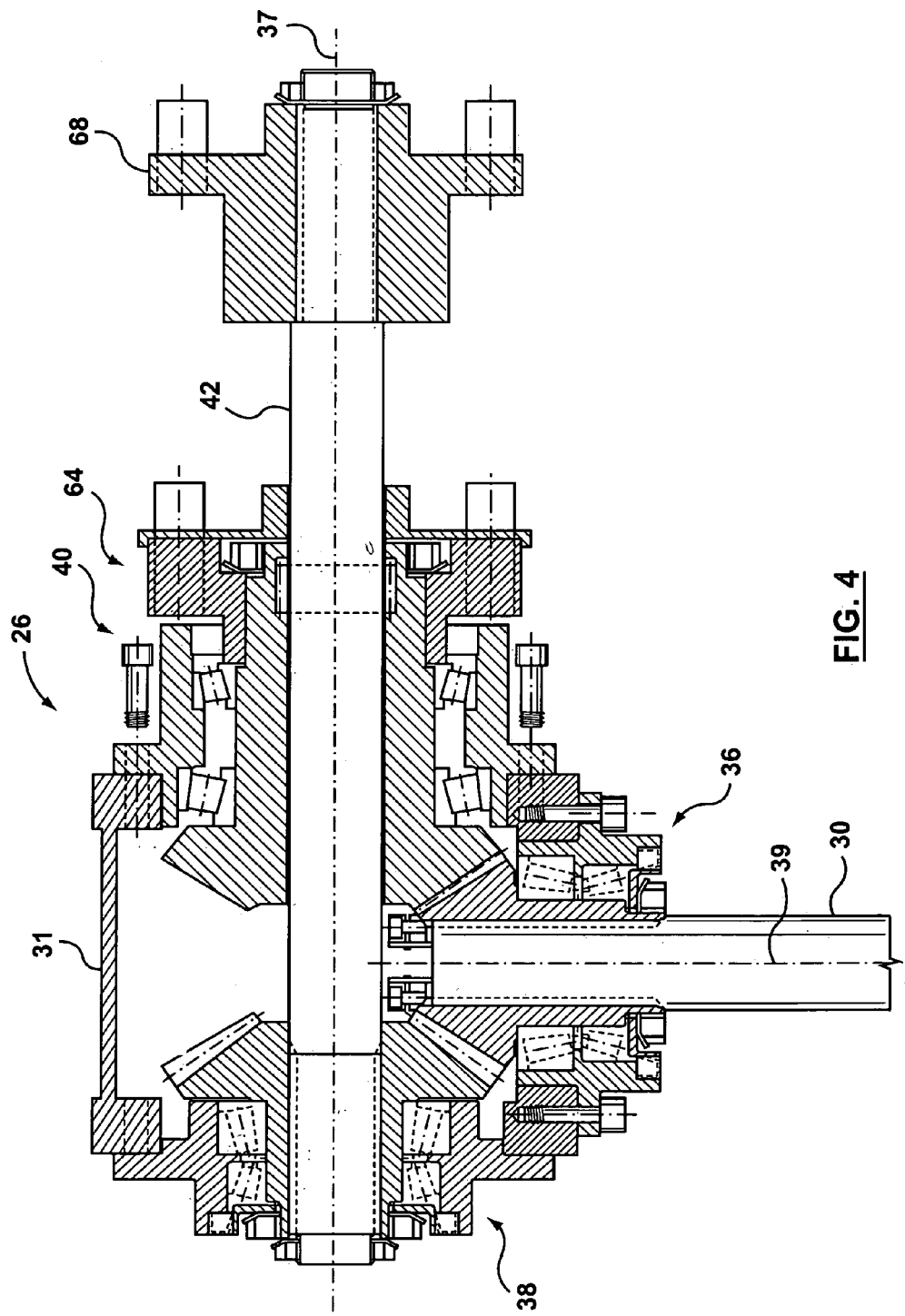
FIG. 4 is a cross sectional side view of the counter rotating air propeller drive illustrating the first drive, second drive and third drive.

Referring now to FIG. 4, a cross sectional view of the counter rotating air propeller drive 26 is further described. A first drive, generally indicated at 36 is illustrated mounted in the first opening 262 of the bottom member 260 as previously described.

A second drive, generally indicated at 38 is illustrated mounted in the second opening 270 of the front member 268 as previously described. The second drive 38 is connected to an air propeller output drive shaft 42. Rotation of the second drive 38 causes rotation of the air propeller output drive shaft 42. A second air propeller hub 68 is mounted on an end of the air propeller output drive shaft 42 for connecting a second air propeller (not shown) to the drive 26.

A third drive, generally indicated at 40, is illustrated mounted in the third opening of the back member 276 s previously described. In the preferred embodiment, a first air propeller hub 64 is mounted directly to the third drive 40 for connecting a first air propeller (not shown) to the drive 40. Alternatively, a first air propeller may be mounted to the third drive 40 without an air propeller hub 64.

The central housing 31 supports and retains the first drive 36, the second drive 38, and the third drive 40 in operational relationship such that rotation of the first drive 36 rotates the second drive 38 in one direction and the first drive 36 also operates the third drive 40 in an opposite direction for driving the counter rotating air propellers. The second drive 38 and the third drive 40 are retained in axial alignment about a lengthwise horizontal axis by the central housing 31. This alignment is obtained by a inner surface of the second opening 270 in the front member 272 engaging a complimentary sidewall inner surface of the second housing member 48, and a surface of the third opening (not shown) in the back member 276 engaging a complimentary sidewall surface of the third housing member 50. The first drive 36 is retained about a substantially perpendicular vertical axis. A inner surface of the first opening 262 in the bottom member 260 engages a complimentary sidewall surface of the first housing member 46 provides alignment of the first drive.

Figure 5:
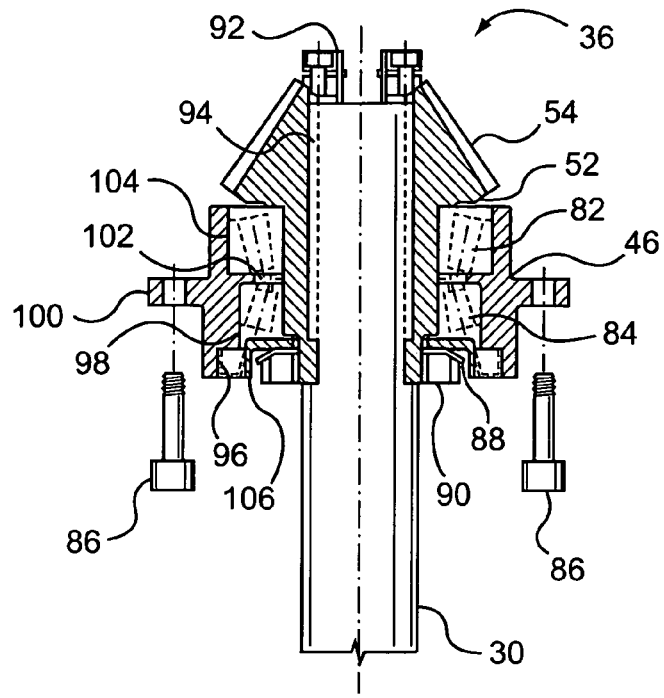
FIG. 5 is a cross sectional side view of the first drive.

Referring now to FIG. 5, the first drive 36 of the counter rotating air, propeller drive 26 is further described.

The first drive 36 has a first housing member generally indicated as 46. The first housing member 46 is a separate member from the central housing 31. The first housing member 46 is formed by a main body with a central axial opening. A first cylindrical recess 96 is located in one end of the first housing member 46 for receiving a retainer 106. Optionally, a seal may be provided between the retainer 106 and the cylindrical recess 96. Persons skilled in the art understand a seal may be provided in other locations to keep a lubricant in the air propeller drive during operation. A second cylindrical recess 98 is formed in the first housing member 46 for receiving a bearing 84. A third cylindrical recess 104 is formed in the first housing member 46 for receiving a second bearing 82. A ledge 102 extends outwardly towards the central opening between the recesses (98, 104) separating the second cylindrical recess 98 and the third cylindrical recess 104. The ledge 102 provides support and a seat for the bearings (82, 84). The first housing member 46 has an outwardly extending flange 100 with a plurality of spaced openings for receiving fasteners. The outwardly extending flange 100 engages a surface 264 (see FIG. 4) for sealing engagement with the housing 31. A plurality of fasteners 86 secure and seal the first housing member 46 the central housing 31. Optionally, a seal ("O" ring or gasket) may be provided between the first housing member 46 and the central housing 31.

The first drive 36 also has a first bevel gear 52. The first bevel gear 52 has a plurality of teeth 54 for engaging teeth of the second bevel gear (not shown) and teeth of the third bevel gear (not shown). One end of the first bevel gear 52 includes a smaller diameter cylindrical threaded portion for receiving a nut 90. The other end of the first bevel gear 52 includes a surface for cooperating with a retainer 92.

A mount 94 is provided to engage the first bevel gear 52 with the interconnecting drive shaft 30. The mount 94 includes a toothed spline on one end of the interconnecting drive shaft 30 and a complimentary toothed spline on the inside surface of the central axial opening of the first bevel gear 52. The central axial opening of the first bevel gear 52 extends the length of the first bevel gear 52. Those skilled in the art will appreciate the mount 94 is not limited to toothed splines. Alternatively for example, a pair of slots and key could be used in the mount 94. The mount 94 provides rotation of the first bevel gear 52 with the interconnecting drive shaft 30 in operation.

The first bevel gear 52 is secured to the interconnecting drive shaft 30 by the retainer 92 and a shoulder on an end of the interconnecting drive shaft 30. While the retainer 92 is illustrated as a member with fasteners located on an end of the interconnecting drive shaft 30, other retainers may be applied. For example, an end of the interconnecting drive shaft 30 may be threaded to receive a nut for securing the first bevel gear 52 to the interconnecting drive shaft 30.

The first bevel gear 52 and the first housing member 46 are assembled to form the first drive 36. The bearing 82 is placed, or pressed, into the cylindrical recess 104 until it bottoms out and seats on a surface of the flange 102. The other bearing 84 is placed, or pressed, into the cylindrical recess 98 until it bottoms out and seats on an opposite surface of the flange 102. A cylindrical shaft of the first bevel gear 52 is inserted into the openings of the bearings (82, 84) until a ledge of the bevel gear 52 contacts a surface of the bearing 82. This locates the first bevel gear 52 in the central opening of the first housing member 46. The retainer 106 is placed over threaded cylindrical section on the first bevel gear 52. The retainer 106 contacts a surface of the bearing 84. A nut is placed on the threaded cylindrical section and tightened to retain the assembly in the first housing member 36. A lock washer 88 keeps the nut tight.

Figure 6:
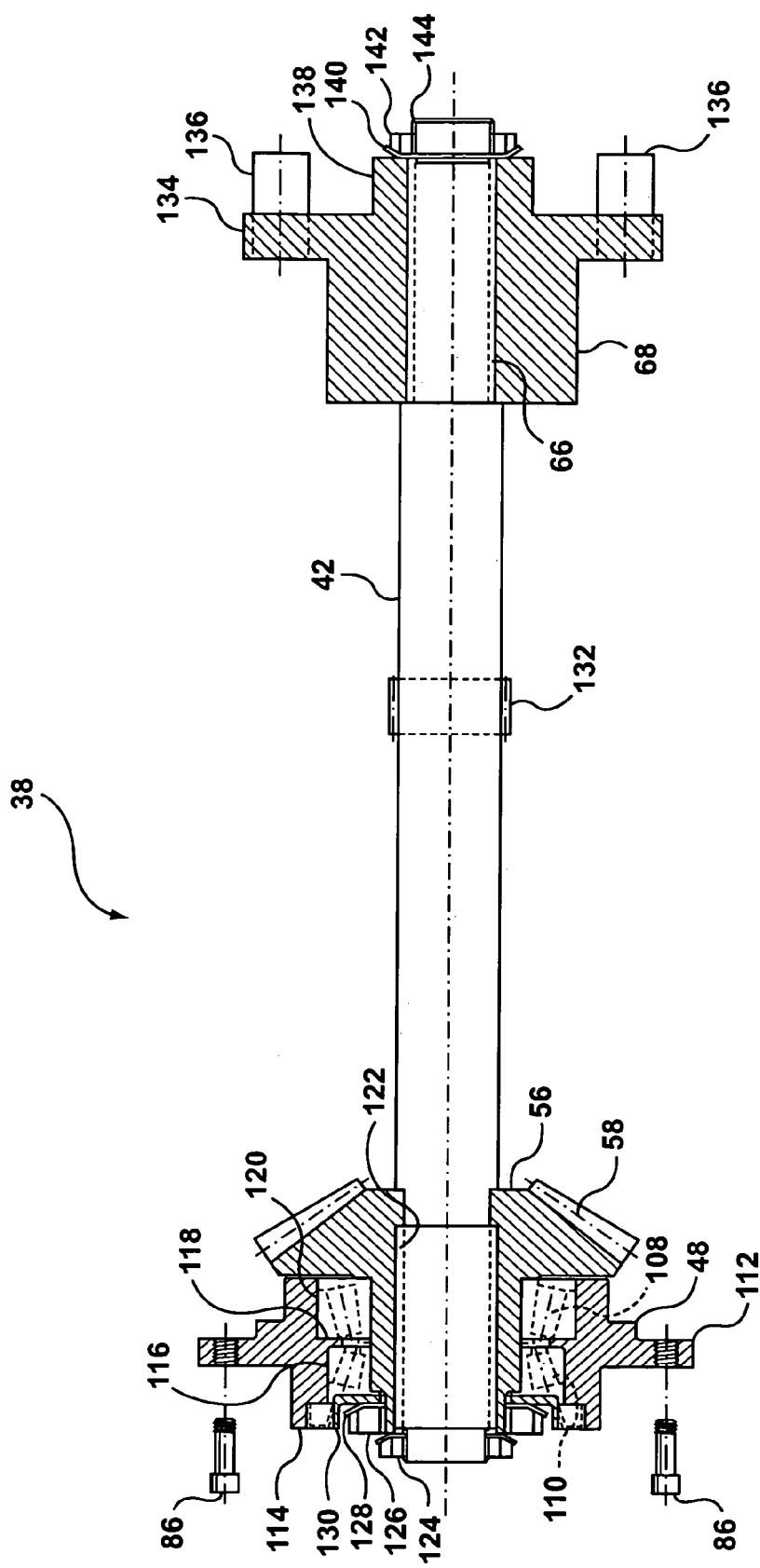
FIG. 6 is a cross sectional side view of the second drive.

Referring now to FIG. 6, the second drive 38 of the counter rotating air propeller drive 26 is further described.

The second drive 38 has a second housing member generally indicated as 48. The second housing member 48 is separate from the central housing 31. The second housing member 48 is formed by a main body with a central opening. A first cylindrical recess 114 is located in one end of the second housing member 48 for receiving a retainer 130. Optionally, a seal may be provided between the retainer 130 and the cylindrical recess 114. Persons skilled in the art understand a seal may be provided in other locations to keep a lubricant in the air propeller drive during operation. A second cylindrical recess 116 is formed in the second housing member 48 for receiving a bearing 110. A third cylindrical recess 120 is formed in the second housing member 48 for receiving a second bearing 108. A ledge 118 extends outwardly towards the central axial opening of the second housing member 48 separating the second cylindrical recess 116 from the third cylindrical recess 120. Opposite sides of the ledge 118 provide support and a seat for the bearings (110, 108). The second housing member 48 has an outwardly extending flange 112 with a plurality of spaced openings for receiving fasteners. The outwardly extending flange 112 engages a surface 272 (see FIG. 7) for sealing engagement. A plurality of fasteners 86 secure and seal the second housing member 48 and the housing 31. Optionally, a seal may be provided between the second housing member 48 and the housing 31 such as an "O" ring or gasket.

The second drive 38 also has a second bevel gear 56. The second bevel gear 56 has a plurality of teeth 58 for engaging teeth of the first bevel gear 52 (not shown). One cylindrical end of the second bevel gear 56 includes threads for receiving a nut 126.

A mount 122 is provided to engage the second bevel gear 56 with the air propeller drive shaft 42. The mount 122 includes a toothed spline on one end of the air propeller drive shaft 42 and a complimentary toothed spline on the inside surface of the central axial opening of the second bevel gear 56. The central axial opening extends the length of the second bevel gear 56. Those skilled in the art will appreciate the mount 122 is not limited to toothed splines. Alternatively for example, a key could be used in the mount 122. The mount 122 provides rotation of the second bevel gear 56 with the air propeller drive shaft 42 in operation.

The second bevel gear 56 is secured to the air propeller drive shaft 42 by the retainer 124 (illustrated as a nut and lock washer) and a shoulder on another end of the air propeller drive shaft 42.

The second bevel gear 56 and the second housing member 48 are assembled to form the second drive 38. The bearing 108 is placed, or pressed, into the cylindrical recess 120 until it bottoms out and seats on a surface of the ledge 118. The other bearing 110 is placed, or pressed, into the cylindrical recess 116 until it bottoms out and seats on an opposite surface of the ledge 118. A cylindrical shaft of the second bevel gear 56 is inserted into the central opening of the bearings (108, 110) until a ledge of the second bevel gear 56 contacts a surface of the bearing 108. This locates the second bevel gear 56 in the central opening of the second housing member 48. The retainer 130 is placed over a cylindrical threaded section of smaller diameter on the second bevel gear 56. The retainer 130 contacts a surface of the bearing 110. A nut is placed on the treaded section and tightened to retain the assembly in the second housing member 48. A lock washer 128 keeps the nut tight.

A bearing 132 is located intermediate on an outside surface of the air propeller drive shaft 42. The bearing 132 provides support and permits rotational movement between the air propeller drive shaft 42 and the third drive 40 (not shown).

The air propeller shaft 42 includes a mount 66 for receiving an air propeller hub 68. The mount 66 includes a toothed spline on one end of the air propeller shaft 42 and a complimentary toothed spline on an inside surface of a central axial opening in the air propeller hub 68. The mount 66 provides rotation of the air propeller hub 68 with the air propeller shaft 42.

An end of the air propeller shaft 42 includes threads 144. The air propeller hub 68 is secured to the air propeller shaft 42 by the nut 142 and a shoulder on the air propeller shaft 42. A lock washer 140 keeps the nut tight. The air propeller shaft 42 includes an outwardly extending flange 134 and a central hub 138. An air propeller is centered and mounted over the central hub and secured to the flange 134 by a plurality of fasteners 136, for example bolts.

Figure 7:
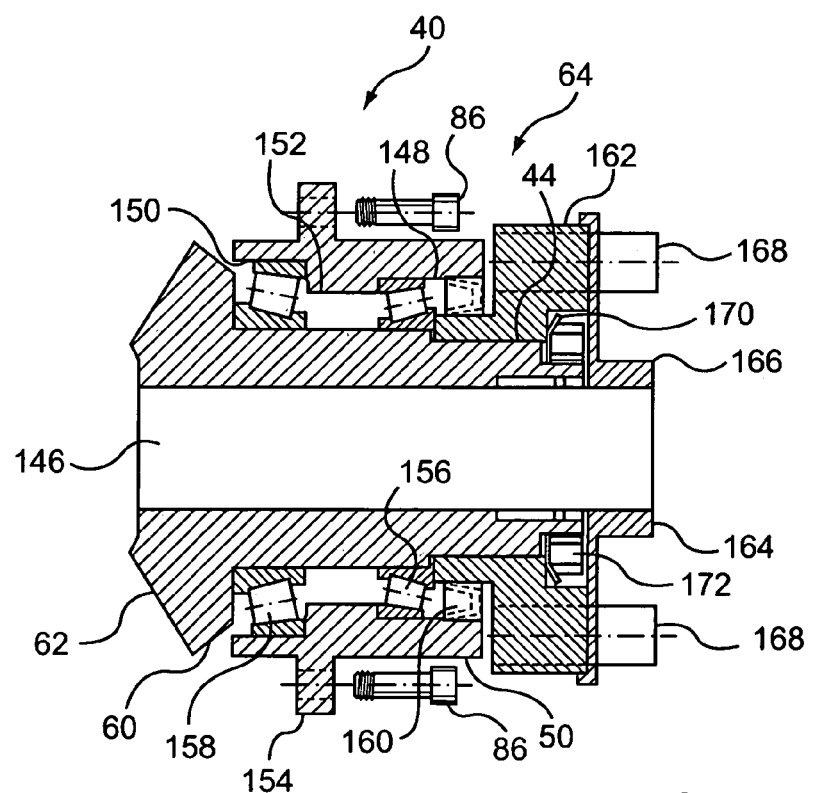
FIG. 7 is a cross sectional side view of the third drive.

Referring now to FIG. 7, the third drive 40 of the counter rotating air propeller drive 26 is further described.

The third drive 40 has a third housing member 50 and a third bevel gear 60. The third housing member 50 is separate from the central housing 31. The third bevel gear 60 has teeth 62 for engaging complimentary teeth 54 on the first bevel gear 52 (see FIG. 5). A central axial opening 146 extends lengthwise through the third bevel gear 60. The air propeller output drive shaft 42 extends through the central axial opening 146 (see FIG. 4). The bearing 132 engages an inner surface of the central opening 146 to support the air propeller output drive shaft 42. The third bevel gear 60 has a substantially cylindrical section. A first diameter portion receives the bearings (156, 158). A second smaller diameter portion includes the mount 44 for mounting the air propeller hub 64. Alternatively, an air propeller (not shown) may be mounted directly to the mount 44. In either embodiment, the air propeller is mounted to the third drive 40 by a drive shaftless connection. A third and smallest diameter portion includes threads for receiving the nut 172.

The third housing member 50 has a cylindrical recess 148, a ledge 152, and another cylindrical recess 150. The cylindrical recess 148 receives the bearing 156 and the other cylindrical recess 150 receives the bearing 158. The ledge 152' provides separation, support, and a seat for the bearings (156, 158). Optionally, a seal 160 is mounted in the cylindrical recess 148. Alternatively, a seal may be provided in other locations of the assembly. An outwardly extending flange 154 includes a plurality of spaced openings to receive fasteners 86. The third drive 40 is mounted in an opening in the back member 276 and secured by the fasteners 86. Optionally, a seal ("O" ring or gasket) is provided to seal the third drive 40 with the central housing 31.

In a preferred embodiment, a mount 44 on the third bevel gear 60 receives the propeller hub 64. The mount 44 includes a toothed spline on an end of the third bevel gear 60 and a complimentary toothed spline on an inner surface of a central axial opening on the first propeller hub member 162.

A washer 170 and the nut 172 secure the propeller hub member 162 on the third bevel gear 60. A second propeller hub member 164 fits over the first propeller hub member 162. The second propeller hub member 164 includes a central opening for passing the air propeller output drive shaft and a central hub 166. The central hub 166 centers an air propeller (not shown) on the hub 166. The air propeller and second propeller hub member 164 are secured to the first propeller hub member 162 by a plurality of fasteners 168.

In assembly, the bearing 158 is placed or pressed into the cylindrical recess 150 until it seats on a surface of the ledge 152. The other bearing 156 is placed or pressed into the cylindrical recess 148 until it seats on an opposite surface of the ledge 152. The cylindrical section of the third bevel gear 60 is placed through the openings of the bearings (158, 156) until a surface of the third bevel gear 60 contacts a surface of the bearing 158. The seal 160 is optionally placed in the cylindrical recess 148. The first propeller hub member 162 is placed over the third bevel gear 60 on the mount 44 until and end of the first propeller hub member 162 engages a surface of the bearing 156. The washer 170 and nut 172 are placed on the threaded end of the third bevel gear 60. The nut is tightened to retain the assembly with the third housing member 50. The washer 170 keeps the nut 172 tight.

Referring now to FIGS. 4, 5, 6, and 7, the gear ratio between the first drive 36 and second drive 38 is preferably 1:1. The gear ratio between the first drive 36 and the third drive 40 is preferably 1:1. Those skilled in the art will appreciate that in the alternative, the two gear ratios may be different. For differing gear ratios, rotation of the first drive 36 causes rotation of the second drive 38 at one speed, and causes simultaneous rotation of the third drive 40 at a different speed providing differential speed between the pair of air propellers.

For example, the radius of the teeth 62 of the third bevel gear 60 could be different from the radius of the teeth 58 of the second bevel gear 56. The teeth 54 of the first bevel gear 52 must be wide enough to engage the teeth 54 on a first region or portion of the teeth 54, and to engage the teeth 58 on a second region or portion of the teeth 54. This provides different gear ratios between the second and third drives.

Figure 8:
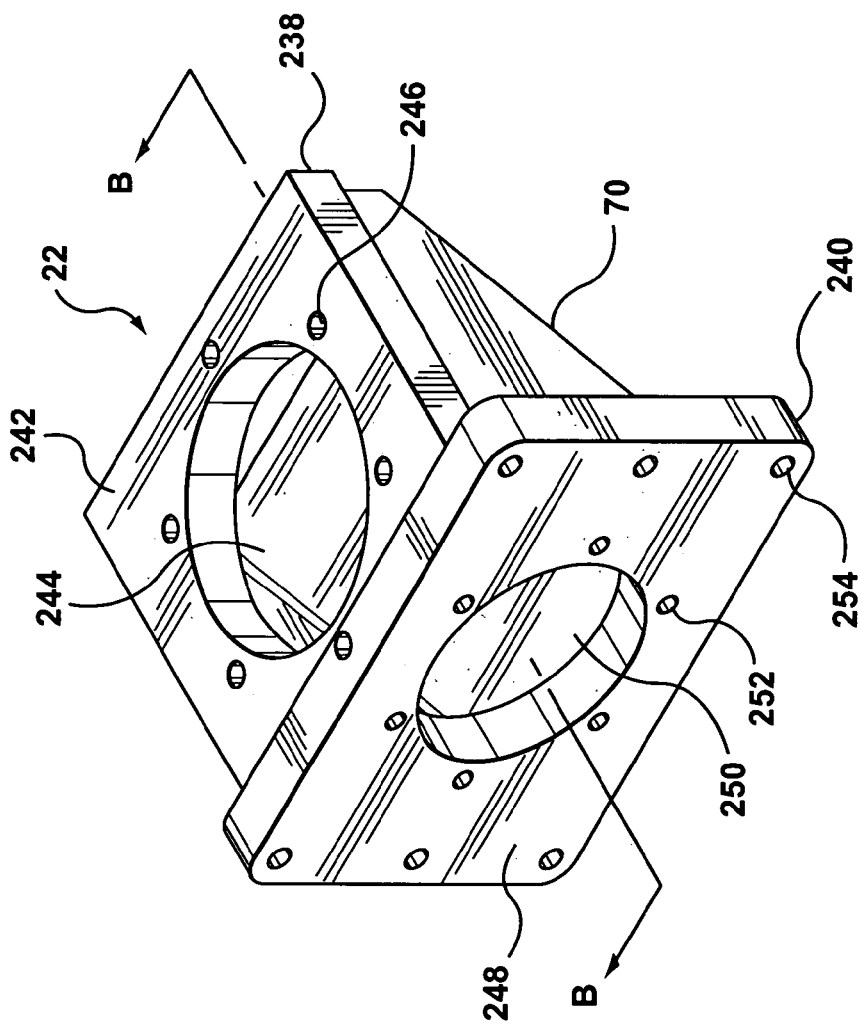
FIG. 8 is a perspective view of the transmission.

Referring now to FIG. 8, the second central housing 70 of the transmission is described. The second housing includes a top member 238. The top member 238 has a mounting surface 242 and a central opening 244. The central opening 244 and surface 242 receive for mounting the fourth drive 32 (not shown). A plurality of threaded bores 246 are provided in the top member 238 for securing and sealing the fourth drive 32 to the top member 238 by a plurality of fasteners, for example bolts.

The second housing also includes a front member 240. The front member 240 has a mounting surface 248 and a central opening 250. The central opening 250 and surface 248 receive for mounting the fifth drive 34 (not shown). A plurality of threaded bores 252 are provided in the front member 240 for securing and sealing the fifth drive 34 to the front member 240 by a plurality of fasteners for example bolts. The front member 240 also includes a plurality of threaded bores 254 for mounting the second central housing 70 to the interconnecting frame 24 by a plurality of fasteners, for example bolts.

Figure 9:
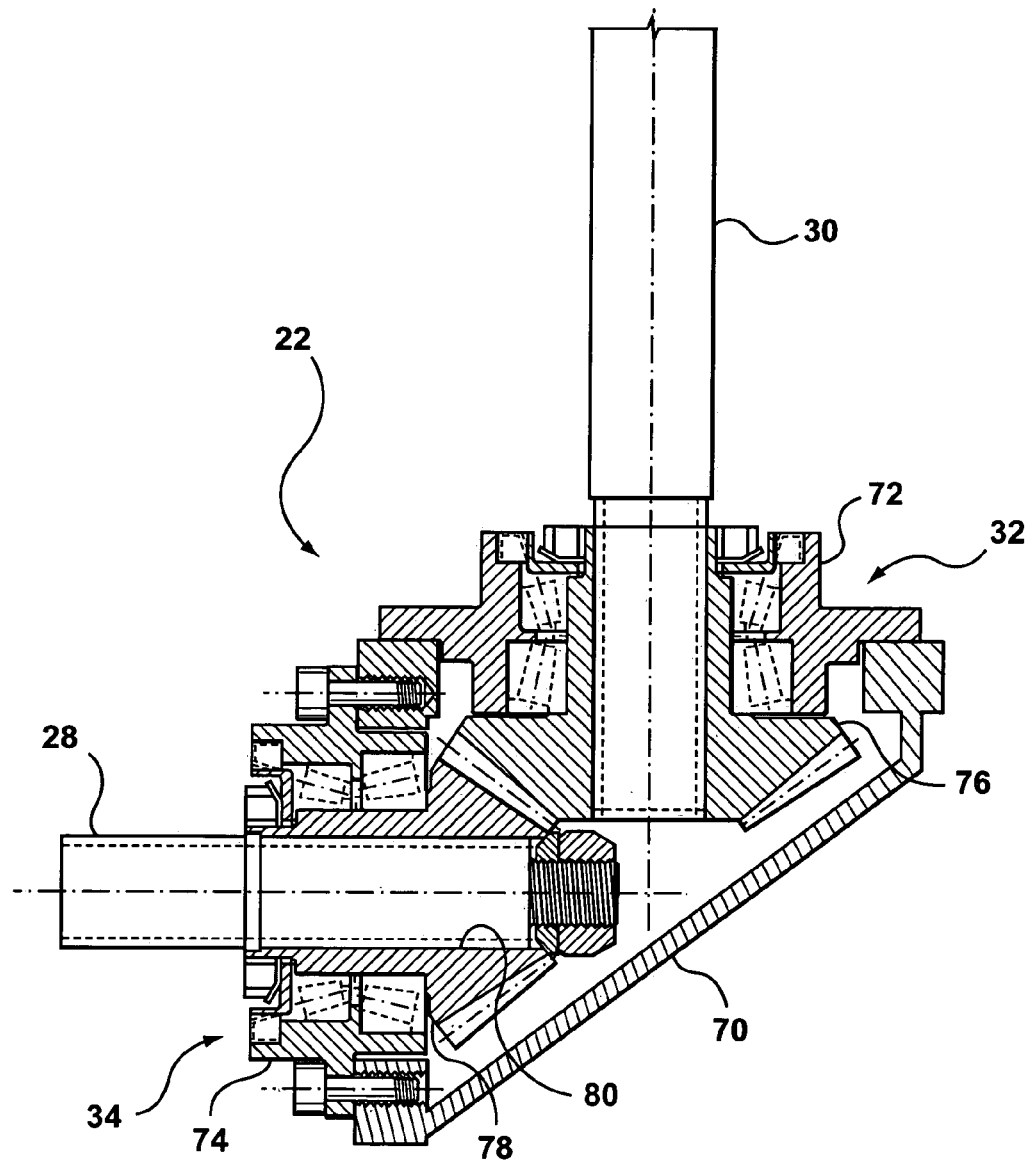
FIG. 9 is a cross sectional side view of the transmission.

Referring now to FIG. 9, the transmission, generally indicated at 22 is described. The transmission 22 includes a second central housing 70, a fourth drive 32, and a fifth drive 34. The second central housing 70 retains the fourth drive 32 and the fifth drive 34 in operational alignment. The fourth drive 32 is retained about a vertical axis and the fifth drive 34 is retained about a substantially perpendicular horizontal axis. The engine (not shown) is connected to the fifth drive 34 through the drive shaft 28. The fifth drive 34 is connected to the fourth drive 32 which in turn is connected through the interconnecting drive shaft 30 to first drive 36 of the counter rotating air propeller drive 26 through the interconnecting drive shaft 30. Rotation of the drive shaft 28 rotates the fifth drive 34, which rotates the fourth drive 32, which rotates the interconnecting drive shaft 30. The gear ratio between the fifth drive 34 and the fourth drive 32 are 1:1, however, those skilled in the art will appreciate different gear ratios may be applied.

Figure 10:
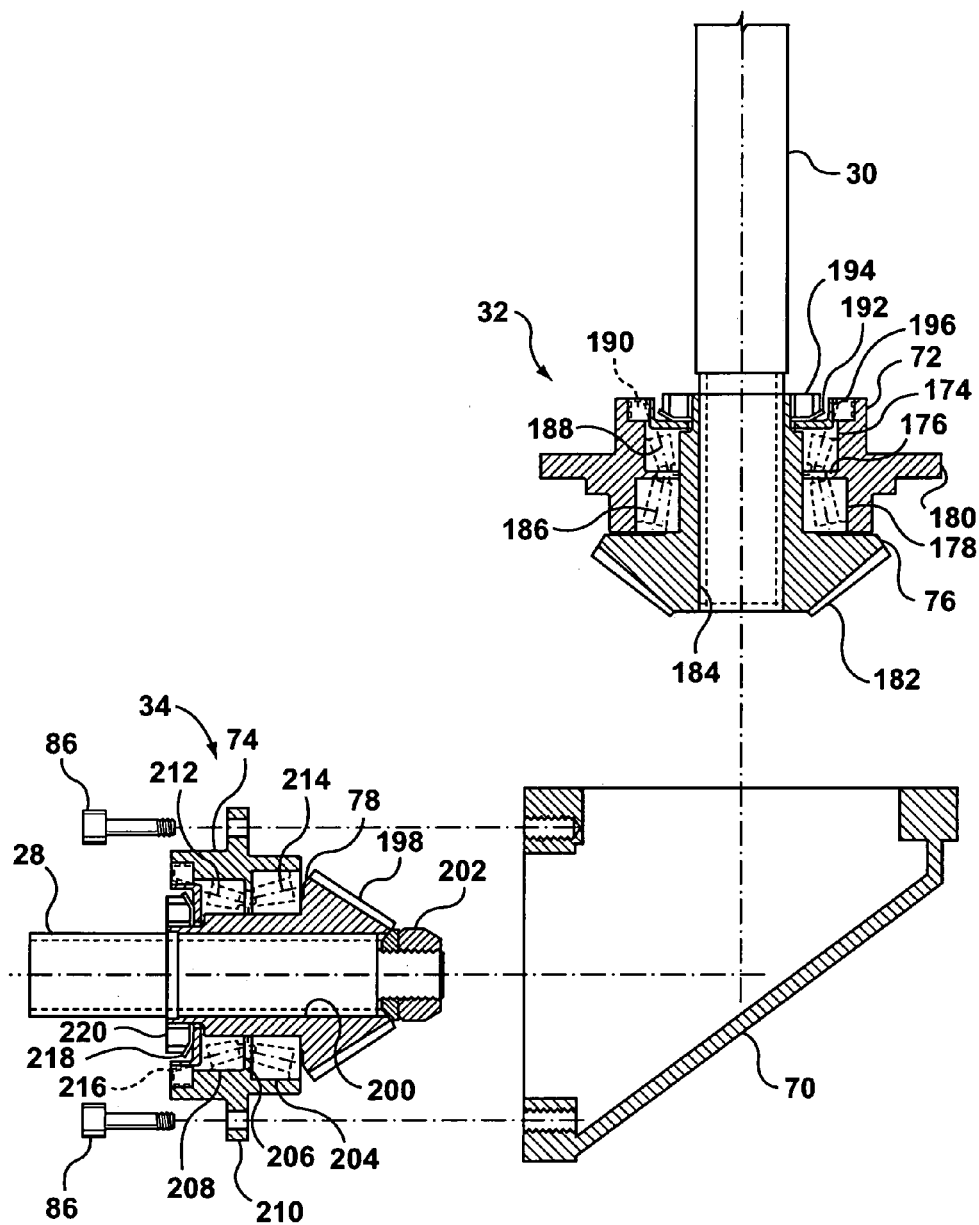
FIG. 10 is an exploded cross sectional side view of the transmission illustrating the fourth drive and fifth drive.

Referring now to FIG. 10, the fourth drive 32 is further described as shown in the exploded view. The fourth drive 32 includes the fourth housing member 72 and the fourth bevel gear 76. The fourth housing member 72 is separate from the second central housing 70. The fourth bevel gear 76 includes teeth 182 for engaging complimentary teeth on the fifth bevel gear 78. The fourth bevel gear 76 has a first cylindrical portion for receiving the bearings (186, 188) and a second cylindrical portion with threads for receiving a nut 194. A mount 184 is provided in the central axial opening of the fourth bevel gear 76. The central axial opening extends the length of the fourth bevel gear 76. The mount 184 includes a spline formed on the surface of the central opening and a spline formed on an end of the interconnecting drive shaft 30. Those skilled in the art appreciate that the mount 184 could also be a pair of slots and key arrangement. The mount 184 is a floating mount that permits lengthwise movement of the interconnecting drive shaft 30 with the fourth bevel gear 76. This permits a degree of height adjustment between the transmission 22 and the air propeller drive 26.

The fourth housing member 72 includes a central axial opening, a first cylindrical recess 178 for receiving a bearing 186, and a second cylindrical recess 174 for receiving another bearing 188. An outwardly extending ledge 176 is formed between the recesses (178, 174) and provides a positive stop and seat for the bearings (186, 188). The nut 194 is tightened on the threads of the fourth bevel gear 76 with the retainer 196 to keep the fourth bevel gear 76 in the fourth housing member 72. The washer 192 keeps the nut tight. Optionally, a seal is provided at an end of the fourth housing member 72 between the retainer and the cylindrical recess.

The fourth drive 32 is assembled by placing or pressing the bearing 186 into the cylindrical recess 178 of the fourth housing member 72 until it seats. Another bearing 188 is placed or pressed into the cylindrical recess 174 of the fourth housing member 72 until it seats. The fourth bevel gear 76 is placed into the central openings of the bearing (186, 188). The retainer 196, washer 192 and nut 194 are placed on the threaded end of the fourth bevel gear 76. The nut 194 is tightened retaining the fourth bevel gear 76 with the fourth housing member 72.

The fourth housing member 72 fits into an opening 244 of the top member 238. The outwardly extending flange 180 includes a plurality of openings (not shown) and is secured and sealed by a plurality of fasteners (not shown). Optionally, a seal ("O" ring or gasket) is provided between the fourth housing member 72 and the second housing 70.

Referring now to FIG. 10, the fifth drive 34 is further described as shown in the exploded view. The fifth bevel gear 78 has a central axial opening for receiving the drive shaft 28. A mount 200 is provided between the central axial opening of the fifth bevel gear 78 and the drive shaft 28. The mount 200 is a spline on the surface of the central opening and a complimentary spline on the outer surface of the drive shaft 28. Alternatively, the mount 200 could be a slot and key arrangement. The fifth bevel gear 78 includes a first cylindrical section for receiving the bearings (212, 214), and a second threaded smaller diameter cylindrical section for receiving the nut 220. Teeth 198 engage complimentary teeth 182 on the fourth bevel gear 76. A retainer 202 secures the drive shaft 28 with the fifth bevel gear 78. The retainer 202 is a chamfered washer and nut combination, however, other forms of a retainer 202 may be applied.

The fifth housing member 74 includes a first cylindrical recess 204 for receiving a bearing 214, and a second cylindrical recess 208 for receiving a bearing 212. The fifth housing member 74 is separate from the second central housing 70. An outwardly extending ledge 206 separates, supports, and provides a seat for the bearings (212, 214). In assembly, the bearing 214 is placed or pressed into the cylindrical recess 204 of the fifth housing member 74 until it seats on a surface of the ledge 206. Another bearing 212 is placed or pressed into the cylindrical recess 208 of the fifth housing member 74 until it seats on an opposite surface of the ledge 206. The cylindrical shaft of the fifth bevel gear 78 is inserted into the openings of the bearings (212, 214). The retainer 216, washer 218, and nut 226 are placed over the threaded end of the fifth bevel gear 78. The nut 220 is tightened to retain the fifth bevel gear 78 in the fifth housing member 74.

The fifth housing member 74 mounts in an opening 250 of the front member 240 and rests in place on the outwardly extending flange 210. The outwardly extending flange 210 includes a plurality of openings for receiving a plurality of fasteners 86 for securing and sealing the fifth housing member 74. Optionally, a seal ("O" ring or gasket) is located between the fifth housing member 74 and the second housing 70.

Figure 11:
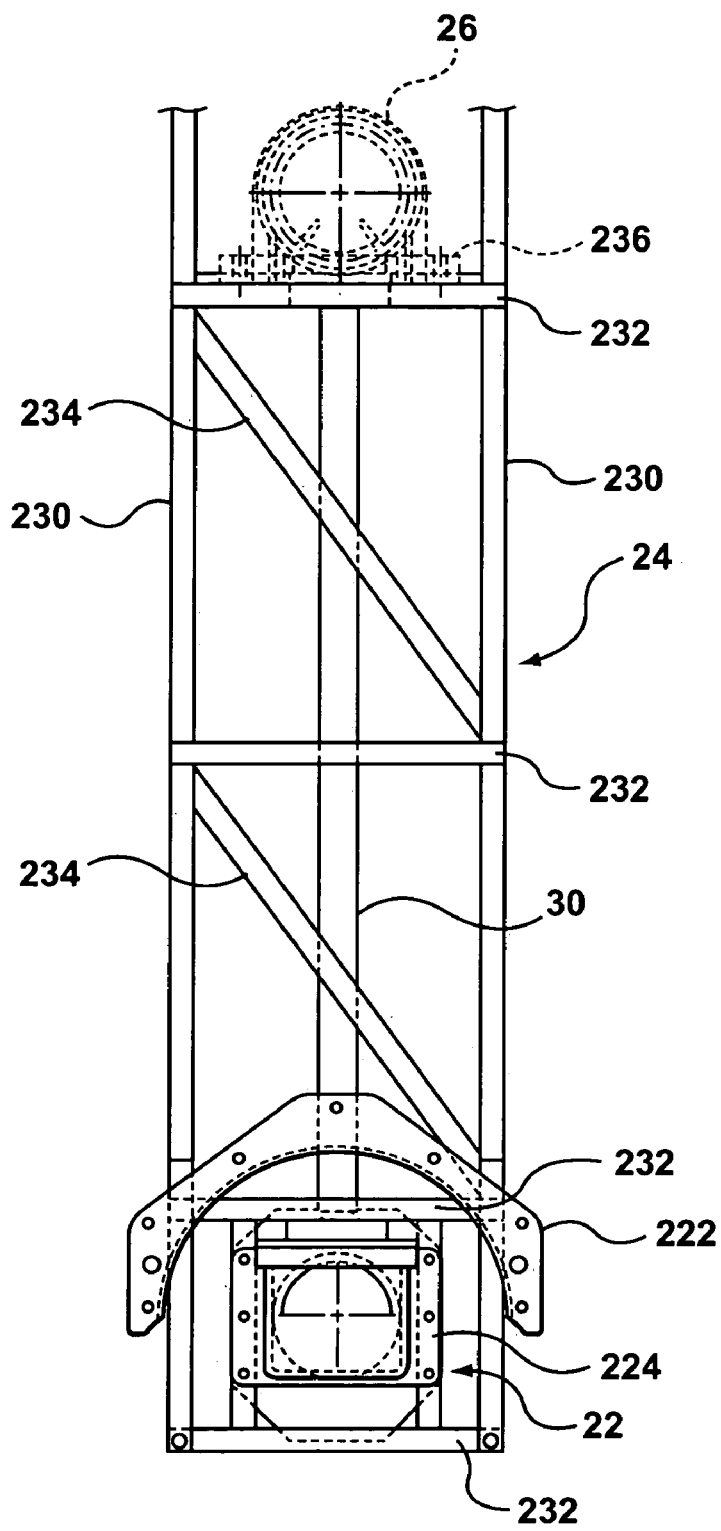
FIG. 11 is an end view of the drive system illustrating the transmission, interconnecting frame, and counter rotating air propeller drive.

Referring now to FIGS. 2 and 11, the interconnecting frame 24 is described. The interconnecting frame 24 includes an engine mount 222 for securing the interconnecting frame 24 to the back of the engine. Another frame mount 226 is provided to secure the interconnecting frame 24 to an inside surface of the hull 12 of the airboat. Another frame mount 228 is provided to secure the interconnecting frame 24 to the transom of the airboat 10.

The interconnecting frame 24 has a number of upright members 230 connected to a number of horizontal members 232 that form a substantially rectangular box like structure. The box like structure is further strengthened by a number of diagonal members 234. The interconnecting frame 24 may be welded together, or fastened together with fasteners such as nuts and bolts. Alternatively, the interconnecting frame 24 could be a cast or an enclosed structure. Alternatively, the interconnecting frame 24 could be part of the air propeller cage. The interconnecting frame 24 has a central vertical opening for receiving the interconnecting drive shaft 30 between the transmission 22 and the air propeller drive 26.

The interconnecting frame 24 has a transmission mount 224 located at one end of the frame and a air propeller drive mount 236 located at another end of the frame. The transmission mount 224 and the air propeller drive mount 236 are located in the interconnecting frame 24 such that the first drive 36 and the fourth drive 32 are in alignment when connected by the interconnecting drive shaft 30. The transmission 22 is secured to the transmission mount 224 by fasteners and the air propeller drive 26 is also secured to the air propeller drive mount 236 by fasteners. In the preferred embodiment, the transmission 22 is mounted to the interconnecting frame 24. Alternatively, the transmission 22 may be mounted to an inside surface of the hull 12 of the airboat 10.

It will, of course, be understood that the above description has been given by way of example only and that modifications in detail may be made within the scope of the present invention.

Nomenclature for the Figures:
- 10—airboat
- 12—hull
- 14—engine
- 16—drive system
- 18—pair of air propellers
- 20—air rudders
- 22—transmission.
- 24—interconnecting frame
- 26—counter rotating air propeller drive
- 28—drive shaft
- 30—interconnecting drive shaft
- 31—central housing
- 32—fourth drive
- 34—fifth drive
- 36—first drive
- 38—second drive
- 40—third drive
- 42—air propeller output drive shaft
- 44—air propeller mount
- 46—first housing member
- 48—second housing member
- 50—third housing member
- 52—first bevel gear
- 54—teeth
- 56—second bevel gear
- 58—teeth
- 60—third bevel gear
- 62—teeth
- 64—air propeller hub
- 66—mount
- 68—second air propeller hub
- 70—second central housing
- 72—fourth housing member
- 74—fifth housing member
- 76—fourth bevel gear
- 78—fifth bevel gear
- 80—mount
- 82—bearing
- 84—bearing
- 86—fastener
- 88—washer
- 90—nut
- 92—retainer
- 94—mount
- 96—cylindrical recess
- 98—cylindrical recess
- 100—flange
- 102—ledge
- 104—cylindrical recess
- 106—retainer
- 108—bearing
- 110—bearing
- 112—flange
- 114—cylindrical recess
- 116—cylindrical recess
- 118—ledge
- 120—cylindrical recess
- 122—mount
- 124—retainer
- 126—nut
- 128—washer 130—retainer
132—bearing
134—flange
136—bolts
138—hub
140—washer
142—nut
144—threaded end
146—central opening
148—cylindrical recess
150—cylindrical recess
152—ledge
154—flange
156—bearing
158—bearing
160—seal
162—first propeller hub member
164—second propeller hub member
166—mount
168—fastener
170—washer
172—nut
174—cylindrical recess
176—ledge
178—cylindrical recess
180—flange
182—teeth
184—mount
186—bearing
188—bearing
190—seal
192—washer
194—nut
196—retainer
198—teeth
200—mount
202—retainer
204—cylindrical recess
206—ledge
208—cylindrical recess
210—flange
212—bearing
214—bearing
216—retainer
218—washer
220—nut
222—engine mount member
224—transmission mount
226—hull frame mount
228—transom frame mount
230—upright members
232—horizontal members
234—diagonal members
236—air propeller drive mount
238—top member
240—front member
242—mounting surface
244—central opening
246—threaded bores
248—mounting surface
250—central opening
252—threaded bores
254—threaded bores
256—mount member
258—openings
260—bottom member
262—central opening
264—mounting surface
266—threaded bores
268—front member
270—central opening
272—mounting surface
274—threaded bores
276—back member
278—primary drive section
280—secondary universal joint
282—primary universal joint
284—sliding joint
286—secondary drive section
288—secondary drive interconnect
290—primary drive interconnect

What is claimed is:

1. An airboat comprising:
a hull;
an engine disposed in said hull;
an air rudder;
a counter rotating air propeller drive system;
said drive system including;
a housing;
a first drive;
a second drive;
and a third drive;
said housing supporting said first drive in engaging relationship with said second drive;
said housing supporting said first drive in engaging relationship with said third drive;
said third drive including an air propeller mount for receiving a first air propeller;
said second drive coupled to an air propeller output drive shaft for receiving a second air propeller;
wherein operation of said first drive operates said second drive in a first direction and said first drive operates said third drive in an opposite direction for counter rotating said air propeller mount and said air propeller output drive shaft.

2. The drive system as in claim 1 wherein:
said first drive includes a first housing member retaining said first drive in relationship with said second drive and said third drive.

3. The drive system as in claim 2 wherein:
said second drive includes a second housing member retaining said second drive in relationship with said first drive.

4. The drive system as in claim 3 wherein:
said third drive includes a third housing member retaining said third drive in relationship with said first drive.

5. The drive system as in claim 1, 2, or 3 wherein:
said first drive is a first bevel gear;
said second drive is a second bevel gear; and
said third drive is a third bevel gear;
wherein teeth on said first bevel gear engage teeth on said second bevel gear, and said teeth on said first bevel gear engage teeth on said third bevel gear for counter rotating said second bevel gear and said third bevel gear.

6. The drive system as in claim 5 wherein:
said third drive includes a mount for receiving a first air propeller hub and said first air propeller is coupled to said first air propeller hub.

7. The drive system as in claim 6 wherein:
said air propeller output drive shaft includes a mount for receiving a second air propeller hub and said second air propeller is coupled to said second air propeller hub.

8. The drive system as in claim 5 wherein:
teeth on said first bevel gear engage teeth on said second bevel gear and said teeth on said first bevel gear engage teeth on said third bevel gear for rotating said air propellers at the same speed.

9. The drive system as in claim 5 wherein:
a first region of teeth on said first bevel gear engage teeth on said second bevel gear and a second region of teeth on said first bevel gear engage teeth on said third bevel gear for rotating said air propellers at differential speeds.

10. The drive system as in claim 1 further including:
a second housing;
a fourth drive;
a fifth drive;
an interconnecting drive shaft; and
a frame;
said second housing supporting said fourth drive in engaging relationship with said fifth drive; said interconnecting drive shaft engaging said fourth drive and said interconnecting drive shaft engaging said first drive, wherein rotating said fourth drive rotates said interconnecting drive shaft for rotating said first drive.

11. The drive as in claim 10 wherein: said fourth drive includes a fourth housing member retaining said fourth drive in relationship with said fifth drive.

12. The drive as in claim 11 wherein:
said fifth drive includes a fifth housing member retaining said fifth drive in relationship with said fourth drive.

13. The drive as in claim 11, or 12 wherein:
said fourth drive includes;
a fourth bevel gear; and
said fifth drive includes:
a fifth bevel gear;
wherein teeth on said fourth bevel gear engage teeth on said fifth bevel gear for rotating in operation said interconnecting drive shaft.

14. The drive as in claim 13 wherein:
said fifth bevel gear includes a mount for receiving an input drive shaft for rotating in operation said fifth drive.

15. A counter rotating air propeller drive system comprising:
a housing;
a first drive;
a second drive;
and a third drive;
said housing supporting said first drive in engaging relationship with said second drive;
said housing supporting said first drive in engaging relationship with said third drive;
said third drive including an air propeller mount for receiving a first air propeller;
said second drive coupled to an air propeller output drive shaft for receiving a second air propeller;
wherein operation of said first drive operates said second drive in a first direction and said first drive operates said third drive in an opposite direction for counter rotating said air propeller mount and said air propeller output drive shaft.

16. The drive system as in claim 15 wherein:
said first drive includes a first housing member retaining said first drive in relationship with said second drive and said third drive.

17. The drive system as in claim 15 or 16 wherein:
said second drive includes a second housing member retaining said second drive in relationship with said first drive.

18. The drive system as in claim 17 wherein:
said third drive includes a third housing member retaining said third drive in relationship with said first drive.

19. The drive system as in claim 18 wherein:
said first drive is a first bevel gear;
said second drive is a second bevel gear; and
said third drive is a third bevel gear;
wherein teeth on said first bevel gear engage teeth on said second bevel gear, and said teeth on said first bevel gear engage teeth on said third bevel gear for counter rotating said second bevel gear and said third bevel gear.

20. The drive system as in claim 19 wherein:
said third drive includes a mount for receiving a first air propeller hub and said first air propeller is coupled to said first air propeller hub.

21. The drive system as in claim 20 wherein:
said air propeller output drive shaft includes a mount for receiving a second air propeller hub and said second air propeller is coupled to said second air propeller hub.

22. The drive system as in claim 19 wherein:
teeth on said first bevel gear engage teeth on said second bevel gear and said teeth on said first bevel gear engage teeth on said third bevel gear for rotating said air propellers at the same speed.

23. The drive system as in claim 19 wherein:
a first region of teeth on said first bevel gear engage teeth on said second bevel gear and a second region of teeth on said first bevel gear engage teeth on said third bevel gear for rotating said air propellers at differential speeds.

24. The drive system as in claim 15 further including:
a second housing;
a fourth drive;
a fifth drive;
an interconnecting drive shaft; and
a frame;
said second housing supporting said fourth drive in engaging relationship with said fifth drive;
said interconnecting drive shaft engaging said fourth drive and said interconnecting drive shaft engaging said first drive;
wherein rotating said fourth drive rotates said interconnecting drive shaft for rotating said first drive.

25. The drive as in claim 24 wherein:
said fourth drive includes a fourth housing member retaining said fourth drive in relationship with said fifth drive.

26. The drive as in claim 25 wherein:
said fifth drive includes a fifth housing member retaining said fifth drive in relationship with said fourth drive.

27. The drive as in claim 25, or 26 wherein:
said fourth drive includes;
a fourth bevel gear; and
said fifth drive includes;
a fifth bevel gear;
wherein teeth on said fourth bevel gear engage teeth on said fifth bevel gear for rotating in operation said interconnecting drive shaft.

28. The drive as in claim 27 wherein:
said fifth bevel gear includes a mount for receiving an input drive shaft for rotating in operation said fifth drive.

* * * * *